(12) United States Patent
Hakoda et al.

(10) Patent No.: US 7,824,164 B2
(45) Date of Patent: Nov. 2, 2010

(54) CONTROLLER OF INJECTION MOLDING MACHINE

(75) Inventors: Takashi Hakoda, Nagano-ken (JP);
Isamu Komamura, Nagano-ken (JP);
Toshimi Kato, Nagano-ken (JP);
Kiyoshi Nakamura, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 210 days.

(21) Appl. No.: 12/285,277

(22) Filed: Oct. 1, 2008

(65) Prior Publication Data
US 2009/0087510 A1    Apr. 2, 2009

(30) Foreign Application Priority Data
Oct. 2, 2007    (JP)    ............... 2007-258664

(51) Int. Cl.
*B29C 45/77*    (2006.01)
(52) U.S. Cl. ............... 425/145; 264/40.5; 425/149
(58) Field of Classification Search ............... 425/145, 425/149; 264/40.5
See application file for complete search history.

(56) References Cited

U.S. PATENT DOCUMENTS

| | | | | |
|---|---|---|---|---|
| 5,585,053 A | * | 12/1996 | Arai | ............... 264/40.1 |
| 5,738,809 A | * | 4/1998 | Hara et al. | ............... 264/40.5 |
| 7,021,917 B2 | * | 4/2006 | Uchiyama et al. | ............ 425/149 |
| 7,235,198 B2 | * | 6/2007 | Shiraishi et al. | ............ 264/40.1 |
| 7,261,540 B2 | * | 8/2007 | Uchiyama et al. | ............ 425/145 |
| 7,435,070 B2 | * | 10/2008 | Shiraishi et al. | ............. 425/145 |
| 7,462,025 B2 | * | 12/2008 | Uchiyama et al. | ........... 425/143 |

FOREIGN PATENT DOCUMENTS

JP    2007-69500 A    3/2007

* cited by examiner

*Primary Examiner*—Tim Heitbrink
(74) *Attorney, Agent, or Firm*—Birch, Stewart, Kolasch & Birch, LLP (57) ABSTRACT

The present invention comprises a speed feedback control system for carrying out speed feedback control on the basis of a speed detected value Vd obtained by converting a position detected value Xd obtained from a screw position sensor 4, a pressure feedback control system for carrying out a pressure feedback control on the basis of a pressure detected value Pdb obtained from an injection pressure sensor 6b, and a VP switching control function portion Fc for carrying out switching from a speed control region to a pressure control region Zp when a pressure deviation Ep between a preset pressure set value Ps and the pressure detected value Pdb becomes a preset switching determination value Eps or less and carrying out the switching to the pressure control region Zp after control of a speed command value in the speed control region Zv by a predetermined control pattern Dp at this switching.

15 Claims, 8 Drawing Sheets

CONTROLLER OF INJECTION MOLDING MACHINE

BACKGROUND OF THE INVENTION

1. Field of the Invention

The present invention relates to a controller of an injection molding machine that controls each operation process in a molding cycle by variably controlling a rotation speed of a driving motor in a hydraulic pump.

2. Description of the Relevant Art

As an injection molding machine on which a controller for controlling each operation process in a molding cycle by variably controlling a rotation speed of a driving motor in a hydraulic pump is mounted, an injection molding machine disclosed in Japanese Patent Laid-Open No. 2007-69500 is known.

This injection molding machine uses a variable discharge type hydraulic pump that can set a fixed discharge flow rate by changing a swash plate angle and is provided with controlling means for controlling each operation process by switching the hydraulic pump to the fixed discharge flow rate corresponding to each operation process set on the basis of a predetermined condition and by variably controlling a rotation speed of a servo motor connected to a servo circuit, with which energy saving performance can be improved, a running cost can be reduced, and an entire initial cost can be reduced. Moreover, moldability and molding quality can be improved, reliability can be enhanced and it can have a longer operating life.

However, the above-mentioned conventional injection molding machine (controller) has the following problems to be solved.

First, since each operation control is made by variably controlling the rotation speed of the servo motor driving the hydraulic pump, a pressure detected value used for feedback control of pressure is obtained from a pressure sensor for detecting a hydraulic pressure discharged from the hydraulic pump and a speed detected value used for feedback control of speed is obtained from an encoder for detecting the rotation speed of the servo motor. By configuring such control system, a physical amount close to the servo motor can be detected and instability in control involved with response delay and the like can be avoided, but since the detection is carried out at a place far from an actual control target, pressure loss based on viscosity by a pressure oil caused by disturbance (temperature change and the like) and its fluctuation generated in a hydraulic circuit in the middle can not be ignored, and particularly, an adverse effect on a molding quality such as a reduction tendency and large variation of a molded product weight is not ignorable.

Secondly, since the pressure detected value and speed detected value are detected at the place far from the actual control target, the obtained pressure detected value and speed detected value are so-called deemed values including temporal lag or error with respect to the pressure and speed generated at the actual control target. Therefore, in order to ensure accurateness (accuracy), adjustment or setting of the control system considering such temporal lag or error is needed, and the adjustment work or setting work becomes cumbersome.

SUMMARY OF THE INVENTION

An object of the present invention is to provide a controller of an injection molding machine that can avoid the effect of a pressure loss based on viscosity of a pressure oil caused by disturbance (temperature change and the like) generated in a hydraulic circuit and its fluctuation and can solve an adverse effect on a molding quality and particularly solve nonconformity of a reduction tendency and a large variation of a molded product weight.

Another object of the present invention is to provide a controller of an injection molding machine that eliminates a need of adjustment in view of temporal lag or error at detection at a place far from a control target and facilitates the adjustment and setting of a control system with respect to a speed and pressure and can improve accurateness (accuracy) of pressure detection and speed detection.

Further, another object of the present invention is to provide a controller of an injection molding machine that avoids a problem that an operation at switching becomes instable and largely fluctuates at the switching of a feedback system when a pressure deviation is large and avoids a problem of the occurrence of a rapid drop in the speed so that a stable and more ideal control can be conducted.

In order to achieve these objects, the controller of an injection molding machine according to the present invention comprises, in configuring a controller of an injection molding machine for controlling each operation process in a molding cycle by variably controlling a rotation speed of a driving motor in a hydraulic pump, a screw position sensor for detecting a screw position of an injection device, at least one or more injection pressure sensors for detecting an injection pressure on the basis of an operation of an injection cylinder of the injection device, a speed feedback control system for feedback control of a speed on the basis of a speed detected value obtained by converting a position detected value obtained from the screw position sensor at least at an injection process, a pressure feedback control system for feedback control of a pressure on the basis of a pressure detected value obtained from the injection pressure sensor at least at the injection process, and a VP switching control function portion for carrying out switching from a speed control region to a pressure control region when a pressure deviation between a preset pressure set value and the pressure detected value becomes a preset switching determination value or less and carrying out the switching to the pressure control region after control of a speed command value in the speed control region by a predetermined control pattern at this switching.

DETAILED DESCRIPTION OF THE PREFERRED EMBODIMENT

Next, a preferred embodiment according to the present invention will be described in detail based on the attached drawings. The attached drawings do not specify the invention but are intended to facilitate understanding of the invention. Also, in order to avoid ambiguity of the invention for known portions, detailed description will be omitted.

First, outline configuration of an injection molding machine M provided with a controller 1 according to this embodiment will be described referring to FIG. 4.

Figure 4:
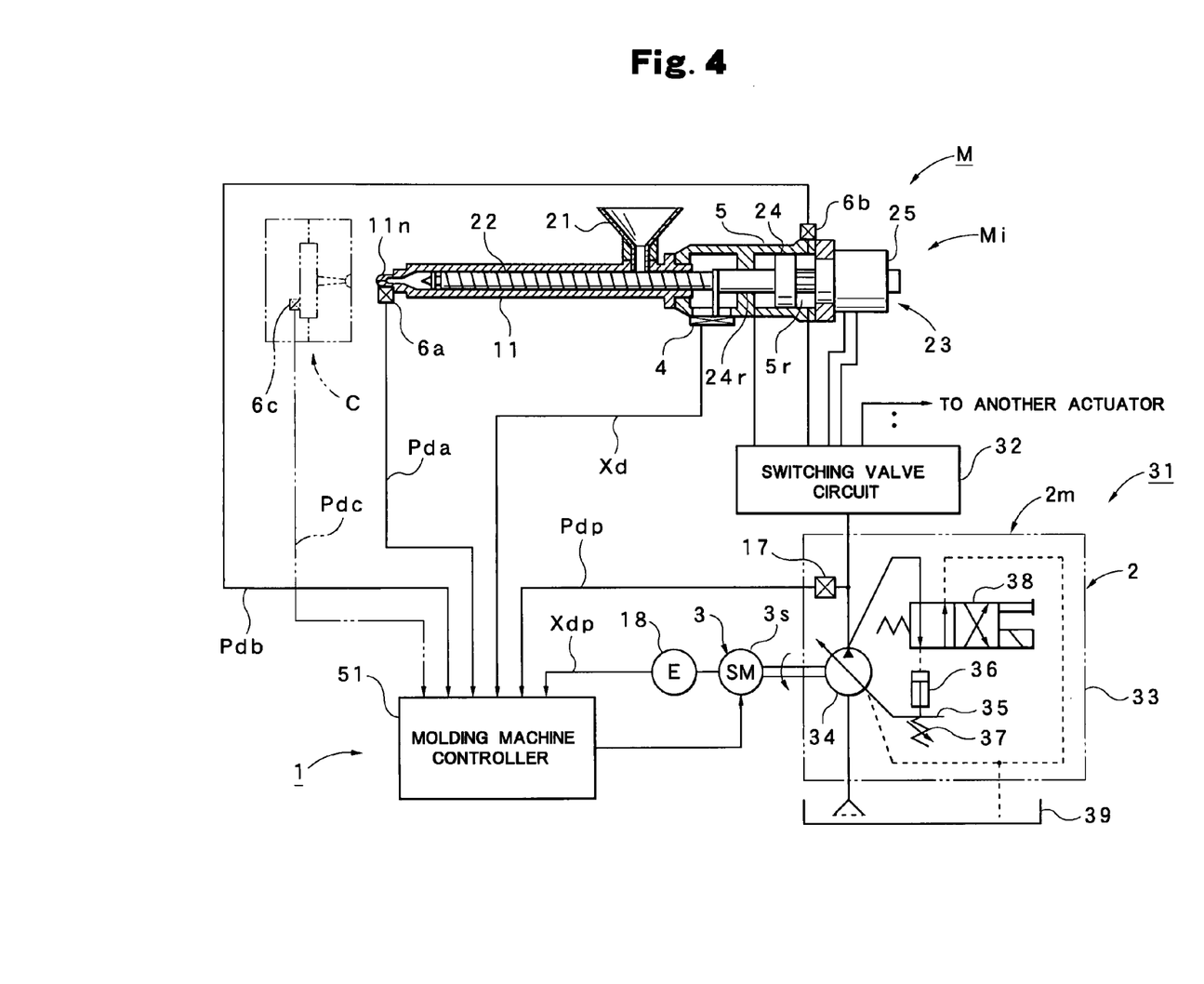
FIG. 4 is an outline configuration diagram of an injection molding machine provided with the controller.

In FIG. 4, reference character M denotes an injection molding machine and is provided with an injection device Mi and a mold clamping device. The mold clamping device is not shown, and only a die C supported by the mold clamping device is shown. The injection device Mi is provided with a heating cylinder 11 having an injection nozzle 11n at a front end and a hopper 21 at a rear end, respectively, a screw 22 is inserted into the heating cylinder 11, and a screw driving portion 23 is provided at the rear end of the heating cylinder 11. The screw driving portion 23 is provided with an injection cylinder (hydraulic cylinder) 5 incorporating a single rod type injection ram 24, and a ram rod 24r projecting in front of the injection ram 24 is coupled with the rear end of the screw 22. At the rear end of the injection ram 24, a shaft of an oil motor 25 mounted on the injection cylinder 5 is spline-coupled. The injection device Mi can bring the injection nozzle 11n into nozzle touch with the die C so that a molten resin is injected and filled in a cavity of the die C.

Meanwhile, reference numeral 31 denotes a hydraulic driving portion and is provided with a variable discharge type hydraulic pump 2m (hydraulic pump 2) to be a hydraulic driving source and a switching valve circuit 32. The hydraulic pump 2m is provided with a pump portion 33 and a servo motor 3s (driving motor 3) for rotating and driving the pump portion 33. The servo motor 3s uses an alternating current servo motor connected to an output port of a molding machine controller 51 constituting the controller 1 according to this embodiment, the servomotor 3s is attached with a rotary encoder 18 for detecting a rotation speed of the servo motor 3s, and the rotary encoder 18 is connected to an input port of the molding machine controller 51.

Also, the pump portion 33 incorporates a pump body 34 constituted by a swash-plate piston pump. Therefore, the pump portion 33 is provided with a swash plate 35, and by increasing an inclination angle (swash plate angle) of the swash plate 35, a stroke of a pump piston in the pump body 34 is increased and a discharge flow rate is increased, while by decreasing the swash plate angle, the stroke of the pump piston is reduced and the discharge flow rate is reduced. Thus, by setting the swash plate angle at a predetermined angle, a fixed discharge flow rate at which the discharge flow rate is fixed to a predetermined magnitude can be set. Moreover, the swash plate 35 is attached with a control cylinder 36 and a return spring 37, and the control cylinder 36 is connected to a discharge port of the pump portion 33 (pump body 34) through a switching valve (electromagnetic valve (38)).

Thereby, the angle (swash plate angle) of the swash plate 35 can be changed by controlling the control cylinder 36.

On the other hand, a suction port of the pump portion 33 is connected to an oil tank 39, a discharge port of the pump portion 33 is connected to a primary side of the switching valve circuit 32 and moreover, a secondary side of the switching valve circuit 32 is connected to the injection cylinder 5 and the oil motor 25 in the injection molding machine M and each of the other actuators including a mold clamping cylinder, an ejector cylinder, and an injection device moving cylinder. Therefore, the switching valve circuit 32 is provided at least with switching valves (electromagnetic valves) connected to the injection cylinder 5, the oil motor 25 and each of the other actuators, respectively. Each switching valve is constituted by one or two or more valve components and other necessary accessory hydraulic components and the like, respectively, and has at least a switching function relating to supply, stop and discharge of hydraulic oil to the injection cylinder 5, the oil motor 25, and each of the other actuators.

Thereby, by variably controlling the rotation speed of the servo motor 3s, the discharge flow rate and discharge pressure of the variable discharge type hydraulic pump 2m can be varied, and on the basis of that, driving control of the above-mentioned injection cylinder 5, the oil motor 25, and each of the other actuators can be carried out. As mentioned above, by using the variable discharge type hydraulic pump 2m that can set the fixed discharge flow rate by changing the swash plate angle for the hydraulic pump 2, the controller 1 according to this embodiment can be put into practice easily and smoothly, which is an advantage.

Next, specific configuration of the controller 1 according to this embodiment will be described referring to FIGS. 1 to 5.

First, the controller 1 is provided with sensors attached to the injection device Mi. Specifically, a screw position sensor 4 using a linear encoder and the like for detecting a position of the screw 22 in the injection device Mi and injection pressure sensors attached at a plurality of places where an injection pressure on the basis of an operation of the injection cylinder 5 of the injection device Mi is detected, that is, a nozzle resin pressure sensor 6a for detecting a resin pressure of the injection nozzle 11n in the injection device Mi, a cylinder internal pressure sensor 6b for detecting a hydraulic pressure inside a rear oil chamber 5r in the injection cylinder 5, and a pump pressure sensor 17 for detecting a hydraulic pressure discharged from the hydraulic pump 2m are provided. Instead of detection of the resin pressure inside the injection nozzle 11n by the nozzle resin pressure sensor 6a, a resin pressure inside the heating cylinder 11 may be detected or a resin pressure inside the die C may be detected by a die resin pressure sensor 6c. And each of the sensors 4, 6a (6c), 6b, and 17 is connected to the input port of the molding machine controller 51.

Figure 1:
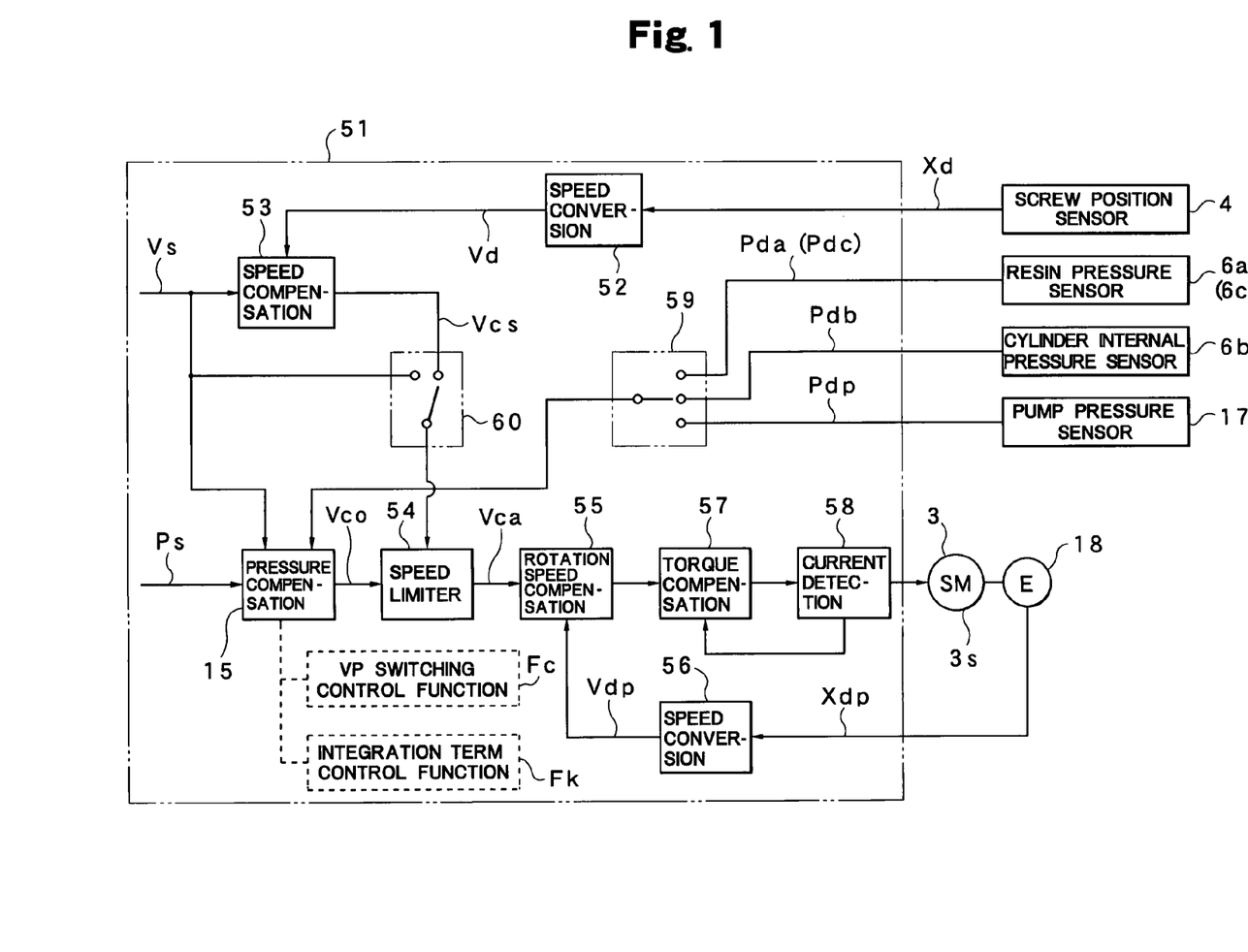
FIG. 1 is a block system diagram illustrating an essential part of a controller according to a preferred embodiment of the present invention.

Meanwhile, FIG. 1 shows a block system diagram of an essential part in the molding machine controller 51. In FIG. 1, reference numeral 52 denotes a speed converter, 53 for a speed compensation portion, 15 for a pressure compensation portion, 54 for a speed limiter, 55 for a rotation speed compensation portion, 56 for a speed converter, 57 for a torque compensation portion, 58 for a current detector, 59 for a sensor switch, and 60 for an input speed switch, respectively. The above-mentioned screw position sensor 4 is connected to the speed converter 52, while the above mentioned resin pressure sensor 6a (6c), the cylinder internal pressure sensor 6b, and the pump pressure sensor 17 are connected to the sensor switch 59, respectively. Thereby, a position detected value Xd obtained from the screw position sensor 4 is converted to a speed detected value Vd by the speed converter 52 and given to the speed compensation portion 53, while pressure detected values Pda (Pdc), Pdb, Pdp obtained from the resin pressure sensor 6a (6c), the cylinder internal pressure sensor 6b, and the pump pressure sensor 17 are selected by the sensor switch 59 and given to the pressure compensation portion 15. Also, a rotation speed detected value Xdp obtained from the rotary encoder 18 is converted to a rotation speed detected value Vdp by the speed converter 56 and given to the rotation speed compensation portion 55. Thereby, feedback control in a minus loop to the rotation speed of the servo motor 3s is carried out. Meanwhile, a preset speed set value (speed target value) Vs is given to the speed compensation portion 53, and a preset pressure set value (pressure target value) Ps is given to the pressure compensation portion 15. This pressure compensation portion 53 is provided with a VP switching control function portion Fc and an integral term control function portion Fk, which will be described later. The speed set value Vs is also given to the input speed switch 60 and the pressure compensation portion 15. By this input speed switch 60, a speed command value Vcs or a speed set value Vs is selected to be an output of the speed compensation portion 53 and given to a speed limiter 54 and set as a speed limit value. A pressure-compensated speed command value Vco outputted from the pressure compensation portion 15 is also given to this speed limiter 54. Moreover, a speed command value Vca outputted from the speed limiter 54 is given to the rotation speed compensation portion 55. Also, a torque command value outputted from the rotation speed compensation portion 55 is given to the torque compensation portion 57. Then, a motor driving current outputted from the torque compensation portion 57 is supplied to the servo motor 3s, by which the servo motor 3s is driven. The size of the motor driving current is detected by the current detector 58 and given to the torque compensation portion 57, by which feedback control in a minus loop to the motor driving current is carried out.

Figure 2:
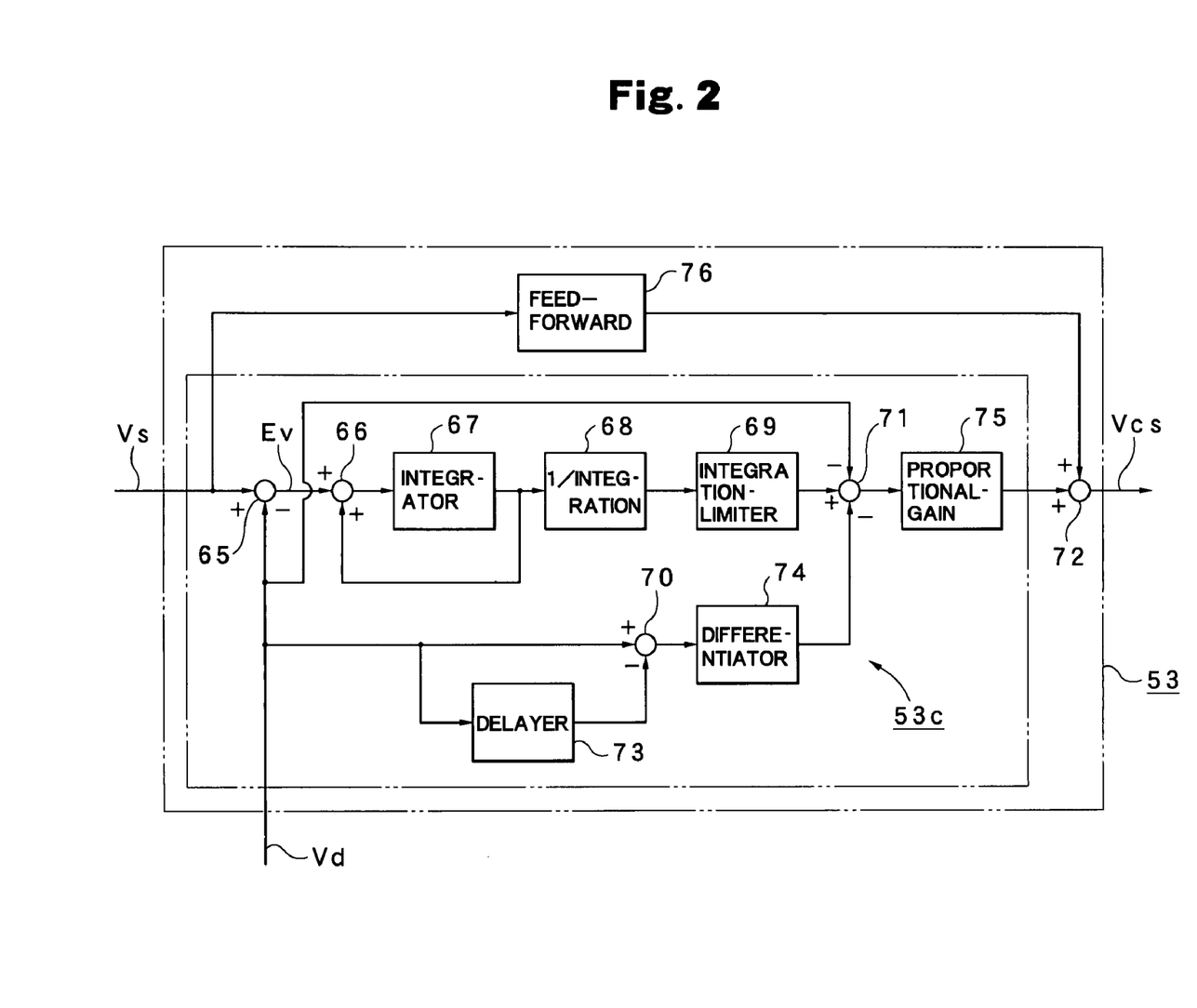
FIG. 2 is a block system diagram of a speed compensation portion in the controller.
Figure 3:
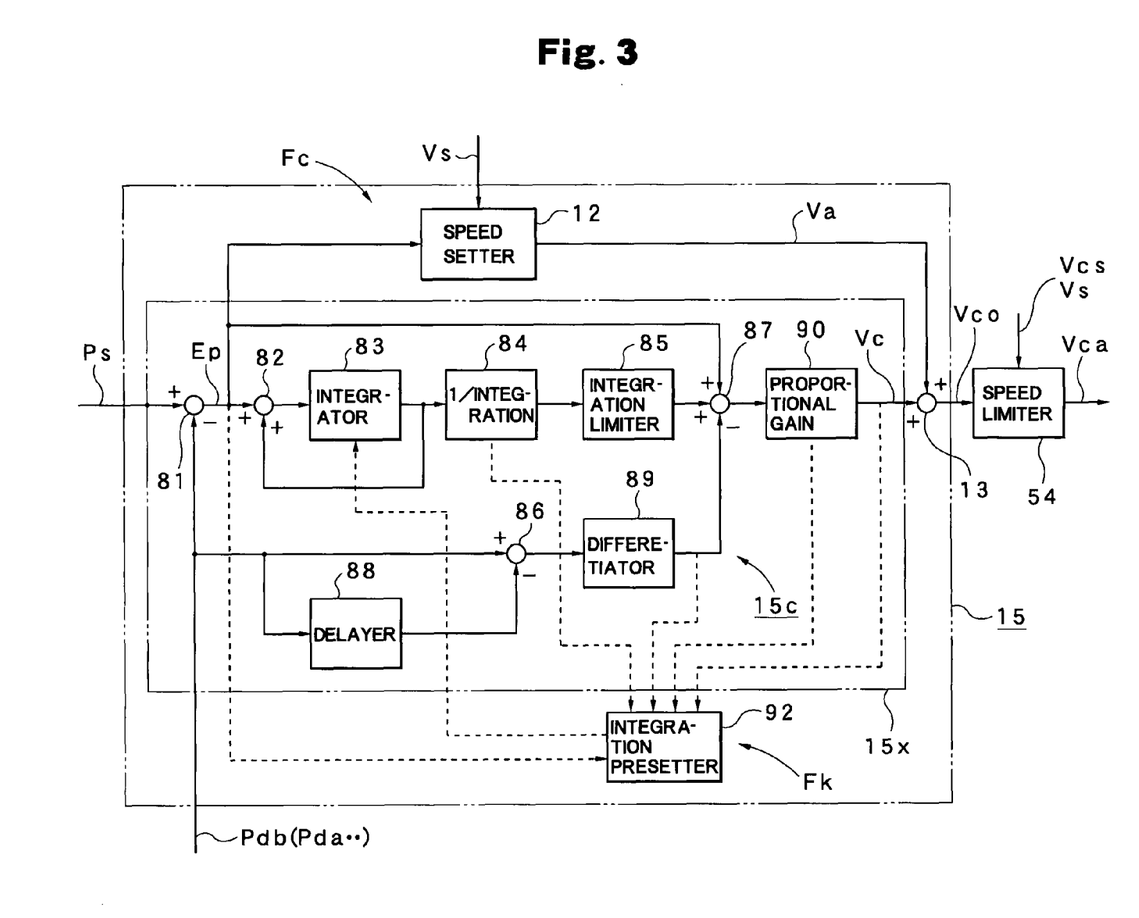
FIG. 3 is a block system diagram of a pressure compensation portion in the controller.

On the other hand, FIG. 2 specifically shows a block system diagram of the above-mentioned speed compensation portion 53, and FIG. 3 specifically shows a block system diagram of the above-mentioned pressure compensation portion 15.

The speed compensation portion 53 shown in FIG. 2 is roughly constituted by a deviation calculator 65 and a PID control system 53c, and the PID control system 53c includes an adder 66, an integrator 67, a calculator 68 for outputting a 1/integration value, an integration limiter 69, a subtractor 70, an adder-subtractor 71, an adder 72, a delayer 73, a differentiator 74, a proportional gain setter 75, and a feed-forward circuit 76. Thereby, at the speed compensation portion 53, a deviation between the speed set value Vs and the speed detected value Vd, that is, a speed deviation Ev is obtained by the deviation calculator 65, and this speed deviation Ev is speed-compensated by the PID control system 53c so as to have the speed command value Vcs, and the speed command value Vcs is given to the input speed switch 60 as an output of the speed compensation portion 53. In the PID control system 53c, I-PD control is carried out. In the controller 1 according to this embodiment, since a hydraulic circuit with relatively slow response is included in the feedback control system for speed, such I-PD control is suitable, which facilitates adjustment of the control system and has an advantage that costs can be reduced.

In the pressure compensation portion 15 shown in FIG. 3, a basic circuit 15x is roughly constituted by a deviation calculator 81 and a PID control system 15c, and the PID control system 15c includes an adder 82, an integrator 83, a calculator 84 for outputting a 1/integration value, an integration limiter 85, a subtractor 86, an adder-subtractor 87, a delayer 88, a differentiator 89, and a proportional gain setter 90. Therefore, in the basic circuit 15x, a deviation between the pressure set value Ps and the pressure detected value Pdb (or Pda . . . ), that is, a pressure deviation Ep is obtained by the deviation calculator 81, and this pressure deviation Ep is pressure-compensated by the PID control system 15c so as to obtain a speed command Vc. This speed command value Vc becomes an output of the basic circuit 15x. In the PID control system 15c, PI-D control is carried out. In the controller 1 according to this embodiment, since the feedback control system for pressure includes a hydraulic system with relatively slow response, such PI-D control is suitable, which facilitates adjustment (encode) of the control and has an advantage that costs can be reduced.

Figure 5:
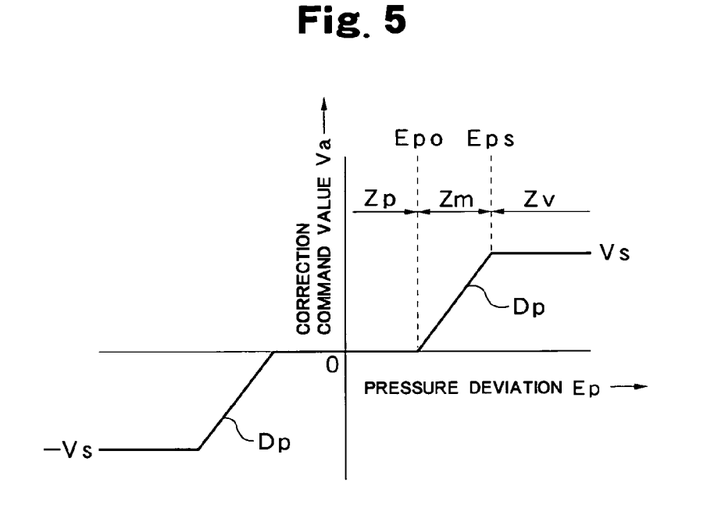
FIG. 5 is a control pattern diagram set at a speed setter constituting a VP switching control function portion in the controller.

Moreover, the pressure compensation portion 15 is provided with the VP switching control function portion Fc and the integral term control function portion Fk in addition to the basic circuit 15c. For the VP switching control function portion Fc, the speed setter 12 is used and also the adder 13 connected between the proportional gain setter 90 and the speed limiter 54 is used. And to the speed setter 12, the pressure deviation Ep, which is an output of the deviation calculator 81, is inputted, and the above-mentioned speed set value Vs is also inputted. To the speed setter 12, as shown in FIG. 5, a control pattern Dp for outputting a correction command value Va corresponding to the pressure deviation Dp is set. Thereby, for the output of the speed setter 12, the correction command value Va corresponding to the size of the pressure deviation Ep, that is, the correction command value Va obtained by converting the inputted speed set value Vs by the control pattern Dp is obtained. This correction command value Va is given to the adder 13 and added to the speed command value Vc obtained from the proportional gain setter 90, and the corrected speed command value Vco obtained from the adder 13 is given to the speed limiter 54. By such VP switching control function portion Fc, after a speed command value in the speed control region Zv is controlled by a predetermined control pattern Dp, the region can be switched to a pressure control region Zp.

Meanwhile, for the integral term control function portion Fk, an integration pre-setter 92 is used. When switching from the speed control region Zv to the pressure control region Zp, this integration pre-setter 92 performs an operation of pre-setting an integral term of the PID control system 15c provided at the pressure compensation portion 15 at a new integral term acquired so that the speed command value Vc after switching matches the speed command value Vc before switching. Therefore, an old speed command value Vcr outputted from the proportional gain setter 90, an old proportional gain Gpr of the proportional gain setter 90, an old differentiation output Dr of the differentiator 89, the new pressure deviation Ep, and a new integration gain Gi obtained from the calculator 84 are given to the integration pre-setter 92, respectively, and by performing calculation processing using the following (100) expression, the new integral term is obtained.

$$\text{New integral term} = \{(Vcr/Gpr) + Dr - Ep\} \cdot Gi \tag{100}$$

As mentioned above, the integral term is acquired by calculating back the old speed command value Vcr before switching by the (100) expression, and the new integral term to be a calculation result (solution) is pre-set at the integrator 83. As a result, when switching from the speed control region Zv to the pressure control region Zp, the speed command value Vc after switching and the speed command value Vc before switching match each other. In this case, the old speed command value Vcr, the old proportional gain Gpr, and the old differentiation output Dr are temporarily stored in the integration pre-setter 92.

Next, an operation of the injection molding machine M including major operations of the controller 1 according to this embodiment, particularly an operation of an injection process will be described referring to FIGS. 1 to 5.

First, fixed discharge flow rates Qo . . . corresponding to each operation process in the molding cycle are set. Specifically, three operation modes (swash-plate angle mode) in which two operation processes and two fixed discharge flow rates Qo, Qs are combined are set and by selecting an operation mode at the molding, a discharge flow rate of the hydraulic pump 2m is switched to the fixed discharge flow rate Qo . . . corresponding to each operation process. In this case, for the one fixed discharge flow rate Qo of the two fixed discharge flow rates Qo, Qs, a discharge flow rate to be a standard is set. Therefore, the swash plate angle is set at a relatively small angle (small capacity side). On the other hand, the other fixed discharge flow rate Qs can be set larger than the fixed discharge flow rate Qo, or specifically, at approximately twice of the fixed discharge flow rate Qo. Therefore, the swash plate angle is set at a relatively large angle (large capacity side). The other fixed discharge flow rate Qs gives little bad influence to the servo motor 3s for a relatively short time (approximately several seconds), but in the case of a relatively long time, a discharge flow rate which might give a bad influence to the servo motor 3s can be set.

As the two operation processes, an injection filling process and a pressure holding process are applied. Processes other than them are not to be selected in the swash-plate angle mode and a discharge flow rate is set to the standard fixed discharge flow rate Qo in advance. The combination of each fixed discharge flow rate Qo . . . for the injection filling process and the pressure holding process is as follows. That is, in the injection filling process, the fixed discharge flow rates Qo, Qs are set according to an injection speed (predetermined condition). Specifically, if the speed of the injection filling process (injection speed) is slow and at 50 [%] or less to a rated speed, for example, the fixed discharge flow rate Qo with a smaller swash plate angle is set, while if the speed of the injection filling process is fast and at 100 [%] of the rated speed, for example, the fixed discharge flow rate Qs with a larger swash plate angle is set. Meanwhile, in the pressure holding process, the fixed discharge flow rates Qo, Qs can be set according to a time of the pressure holding process (predetermined condition). Specifically, if time of the pressure holding process is usual or long, the fixed discharge flow rate Qo is set, while if the time of the pressure holding process is as short as for several seconds or if pressure fluctuation is large at switching from the injection filling process to the pressure holding process, the fixed discharge flow rate Qs is set.

As mentioned above, first, the operation mode in which the operation process and the fixed discharge flow rate Qo . . . are combined is set and at the molding, the operation mode is selected so that switching can be made to the fixed discharge flow rate Qo . . . corresponding to the operation process, and there is an advantage that control can be simplified and the control can be performed on the user side easily and accurately. Also, since the operation process includes the injection filling process and the pressure holding process, the most desirable performance from the viewpoint of fulfillment of both simplification of the control and the attainment of the effect can be obtained. Particularly, since a hydraulic pump 2 for which at least a plurality of fixed discharge flow rates can be set is used, when seen from the servo motor 3s, the hydraulic pump 2 can be separately used as one of a plurality of hydraulic pumps from a small-capacity type to a large-capacity type, and separate measures against an instable region where the rotation speed of the servo motor 3s is decreased will not need any more or can be reduced, which contributes to improvement of energy saving performance and reduction of running costs.

Next, the operation of the injection process (injection filling process, pressure holding process) will be described in order. First, in order to facilitate understanding of this invention, a basic operation excluding the VP switching control function portion Fc and the integral term control function portion Fk will be described.

First, in the injection filling process, the discharge flow rate is switched to the fixed discharge flow rate Qs. That is, by switching and controlling the switching valve 38, the angle of the swash plate 35 is changed to a large swash plate angle. As a result, the hydraulic pump 2m is operated as the large-capacity hydraulic pump 2 that discharges a large flow rate of the fixed discharge flow rate Qs. Also, by the sensor switch 59, the cylinder internal pressure sensor 6b is selected. In this case, based on the selection of the cylinder internal pressure sensor 6b, the resin pressure sensor 6a (6c) can be selected by the condition. As above, in this embodiment, since the nozzle resin pressure sensor 6a for detecting a resin pressure inside the injection nozzle 11n in the injection device Mi, the cylinder internal pressure sensor 6b for detecting a hydraulic pressure inside the injection cylinder 5, and a die resin pressure sensor 6c for detecting a resin pressure inside the die C are provided, a more desirable place for detection corresponding to each operation process, molding condition and the like can be selected, and accurate control suitable for the operation process, molding condition and the like can be performed, which is an advantage. Moreover, by the input speed switch 60, an output of the speed compensation portion 53, that is, the speed command value Vcs is selected.

Thereby, in the injection filling process, the servo motor 3s is driven by the molding machine controller 51, and a pressure oil is supplied to the rear oil chamber 5r of the injection cylinder 5 by the operation of the hydraulic pump 2m. As a result, since the injection ram 24 and moreover, the screw 22 are advanced and moved, a metered molten resin in the heating cylinder 11 is injected and filled in the cavity of the die C through the injection nozzle 11n. At this time, the position detected value Xd obtained from the screw position sensor 4 is converted by the speed converter 52 to the speed detected value Vd and given to the deviation calculator 65. At the deviation calculator 65, a deviation between the speed set value Vs and the speed detected value Vd, that is, the speed deviation Ev is obtained, and by the PID control system 53c, the speed command value Vcs obtained by speed-compensating the speed deviation Ev is obtained. And this speed command value Vcs is given to the speed limiter 54 through the input speed switch 60.

Also, the pressure detected value Pdb obtained from the cylinder internal pressure sensor 6b is given to the deviation calculator 81. At the deviation calculator 81, a deviation between the pressure set value Ps and the pressure detected value Pdb, that is, the pressure deviation Ep is obtained, and by the PID control system 15c, the speed command value Vc obtained by pressure-compensation of the pressure deviation Ep is obtained as an output of the proportional gain setter 90. Therefore, if the VP switching control function portion Fc is not considered, this speed command value Vc is given to the speed limiter 54. At the speed limiter 54, the speed command value Vcs outputted from the speed compensation portion 53 is set as the speed limiter value. In the injection filling process, since the injection pressure (pressure detected value Pdb) is low, the pressure deviation Ep (speed command value Vc) becomes large. Thus, from the speed limiter 54, the speed feedback control is performed so that the speed command value Vcs, which is the speed limiter value, is outputted as the speed command value Vca and the injection speed becomes the speed set value Vs.

Meanwhile, with progress of the injection filling process, the injection pressure is gradually raised, that is, the pressure detected value Pdb is gradually increased. At the controller 1, the pressure deviation Ep (speed command value Vc) between the pressure set value Ps and the pressure detected value Pdb becomes small, and when the deceleration command value Vc becomes smaller than the speed command value Vcs, which is the speed limiter value, switching is made to substantial pressure control. And transition is made to the pressure holding process when the position detected value Xd obtained from the screw position detection sensor reaches the predetermined position (VP switching position) or the target set value Ps (VP switching pressure). In the pressure holding process (pressure control region Zp), the pressure feedback control is carried out so that the pressure deviation Ep (speed command value Vc) becomes smaller than the speed command value Vcs, the speed command value Vc obtained from the pressure compensation portion 15 is outputted as the speed command value Vca from the speed limiter 54, and the pressure detected value Pdb becomes the pressure set value Ps.

Thus, in the above basic operation, the speed feedback control is carried out on the basis of the speed detected value Vd converted from the position detected value Xd obtained from the screw position sensor 4, and the pressure feedback control is carried out on the basis of the pressure detected value Pdb obtained from the injection pressure sensor 6b, and the influence of a pressure loss based on the viscosity of the pressure oil caused by disturbance (temperature change and the like) and its fluctuation can be avoided. Therefore, an adverse effect on the molding quality and particularly the nonconformity such as a decreasing tendency and a large fluctuation in the molded product weight can be solved. Also, by using the screw position sensor 4 for detecting the screw position of the injection device Mi and the injection pressure sensor 6b for detecting the injection pressure on the basis of the operation of the injection cylinder 5 of the injection device Mi, the pressure detected value Pdb and the speed detected value Vd at a place closer to an actual control target is obtained, and the pressure detected value Pdb and the speed detected value Vd become values identical or closer to actual pressure and speed generated at the control target, and adjustment in view of temporal lag or error at detection at a place far away from the control target is not needed any more. Therefore, adjustment and setting of the control system to the speed and pressure is facilitated and accurateness (accuracy) of the pressure detection and speed detection can be improved.

In the controller 1 according to this embodiment, since the VP switching control function portion Fc and the integral term control function portion Fk are provided, operations based on the VP switching control function portion Fc and the integral term control function portion Fk are added to such basic operations. The operations based on the VP switching control function portion Fc and the integral term control function portion Fk will be described below referring to FIGS. 1 to 7.

Figure 6:
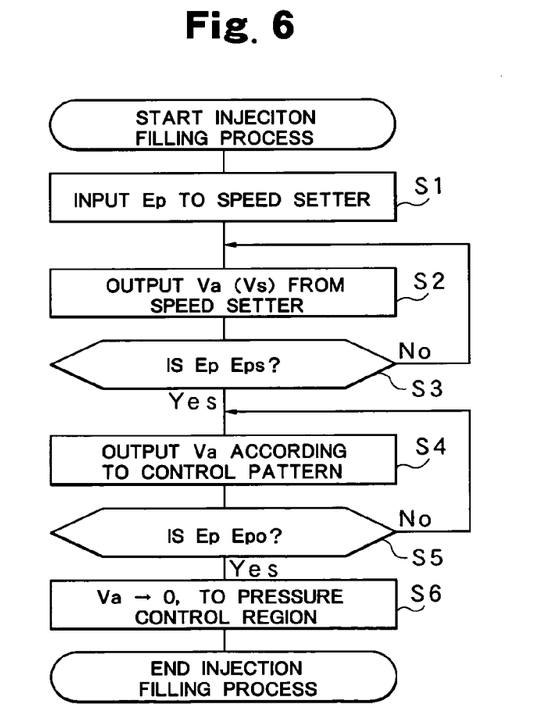
FIG. 6 is a flowchart for explaining an operation of the VP switching control function portion in the controller.

First, the operation of the VP switching control function portion Fc will be described referring to a flowchart shown in FIG. 6.

By start of the injection filling process, the pressure deviation Ep is given to the speed setter 12 (Step S1). Thereby, from the speed setter 12, the correction command value Va corresponding to the size of the pressure deviation Ep is outputted according to the control pattern Dp (Step S2). At the beginning of the injection filling process, the injection pressure (pressure detected value Pdb) is low and as a result, the pressure deviation Ep becomes large. Thus, as shown in FIG. 5, as the correction command value Va outputted from the speed setter 12, the speed set value Vs is outputted as it is. Meanwhile, when the injection filling process progresses and gets close to the end, the pressure detected value Pdb gradually becomes larger and as a result, the pressure deviation Ep becomes gradually small. And when the pressure deviation Ep reaches a switching determining value Eps, as shown in FIG. 5, the correction command value Va according to the control pattern Dp is outputted from the speed setter 12 and added by the adder 13 to the speed command value Vc obtained from the pressure compensation portion 15 (Steps S3, S4). That is, if the pressure deviation Ep becomes smaller than the switching determining value Eps, in correspondence with the size of the pressure deviation Ep, the correction command Va by which the speed set value Vs is gradually decreased according to the control pattern Dp is outputted from the speed setter 12, and the speed command value Vco after correction obtained by adding the correction command value Va and the speed command value Vc together is given to the speed limiter 54. In this case, if the VP switching control function portion Fc is not operated, when the pressure deviation Ep reaches the switching determining value Eps, the switching is immediately made from the speed control region Zv to the pressure control region Zp, but by operating the VP switching control function portion Fc, even if the pressure deviation Ep becomes the switching determining value Eps, such control is executed that the speed set value Vs is maintained and after that, the speed set value Vs is gradually decreased according to the control pattern Dp, and thus, a phenomenon that the injection speed is rapidly lowered will not occur.

Then, when the pressure deviation Ep is further decreased and reaches the end determining value Epo for ending the transition control set in advance as shown in FIG. 5, the speed correction value Va outputted from the speed setter 12 becomes 0 (Steps S5, S6). That is, at this time, substantial transition is made from the speed control region Zv to the pressure control region Zp. By operating the VP switching control function portion Fc for changing the speed command value Vs in the speed control region Zv to the pressure control region Zp after control by the predetermined control pattern Dp at the switching from the speed control region Zv to the pressure control region Zp, stable and more ideal control can be performed. Particularly, in this embodiment, since the VP switching control function portion Fc is constituted by using the speed setter 12 in which the control pattern Dp for outputting the correction command value Va corresponding to the pressure deviation Ep is set and the adder 13 for adding the correction command value Va outputted from the speed setter 12 to the speed command value Vc generated on the basis of the pressure deviation Ep, the control that the transition is made to the pressure control region Zp after the speed command value in the speed control region Zv is controlled by the predetermined control pattern Dp can be performed easily and smoothly, which is an advantage.

Figure 7:
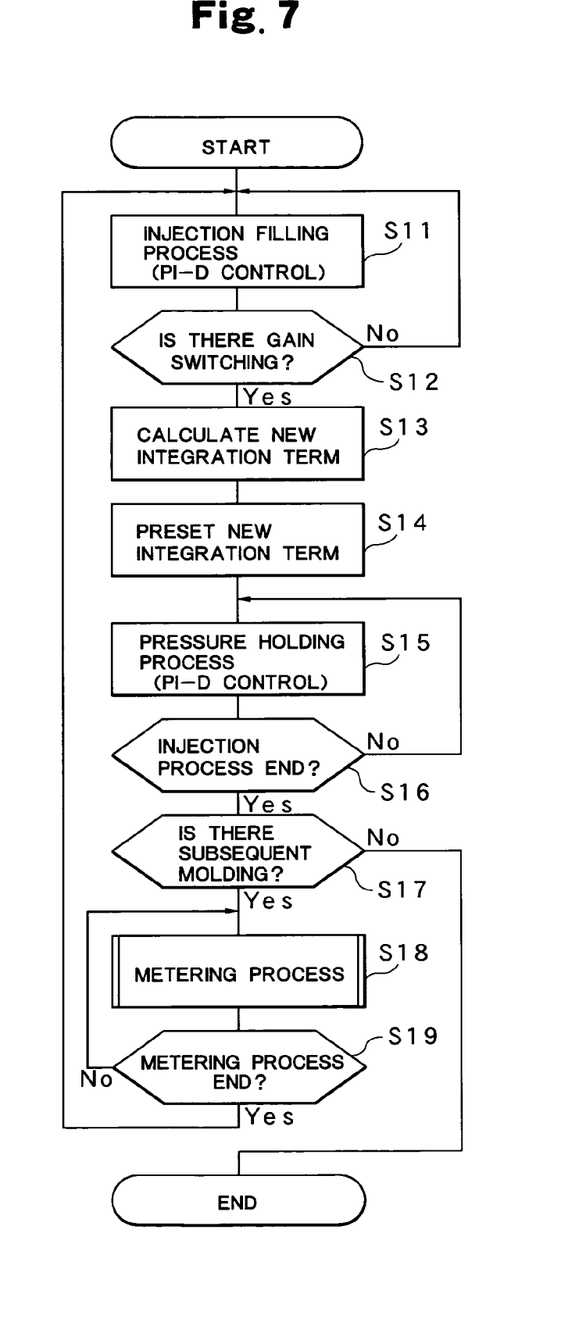
FIG. 7 is a flowchart for explaining an operation of an integral term control function portion in the controller.

Next, the operation of the integral term control function portion Fk will be described referring to a flowchart shown in FIG. 7.

Upon start of the injection filling process, at the pressure compensation portion 15, the PI-D control is carried out as mentioned above (Step S11). In this case, at the proportional gain setter 90, an optimal proportional gain is set for each process, and a corresponding proportional gain is also set in the injection filling process. Meanwhile, when the injection filling process progresses and the pressure deviation Ep reaches the switching determining value Eps, switching is made from the speed control region Zv to the pressure control region Zp on control, and at the proportional gain setter 90, switching is made to the proportional gain corresponding to the pressure holding process. The integration pre-setter 92 calculates a new integral term by the switching timing of the proportional gain (Step S12, S13). That is, the calculation at the above-mentioned (100) expression is carried out. Thereby, the new integral term in which the speed command value Vc after switching of the proportional gain matches the speed command value Vc before switching is obtained, and the integration pre-setter 92 pre-sets the obtained new integral term in the integrator 83 (Step S14). Therefore, by providing such integral term control function portion Fk, even if the speed control region Zv is switched to the pressure control region Zp, rapid fluctuation does not occur in the speed command value Vc at the switching, and instable fluctuation such as overshoot and undershoot caused by a shock at the switching can be prevented. Also, if the speed control region Zv is switched to the pressure control region Zp, the pressure holding process is carried out and the feed-back control is performed for the pressure-holding power by the PI-D control (Step S15).

Meanwhile, when the pressure-holding process is finished, the injection process is finished (Step S16). Upon end of the injection process, the metering process is carried out (Steps S17, S18). In the metering process, since the above-mentioned swash-plate angle mode is not to be a selection target, the fixed discharge flow rate Qo to be the standard is set at the hydraulic pump 2*m*. Also, for the pressure sensor used for the pressure control, the pump pressure sensor 17 for detecting a hydraulic pressure discharged from the hydraulic pump 2 is used (selected), and for the position sensor used for the speed control, the rotary encoder 18 for detecting the rotation speed of the servo motor 3*s* is used (selected). That is, in the operation process other than the injection process, the pressure feedback control is carried out on the basis of the pressure detected value Pdp detected by the pump pressure sensor 17, and the speed feedback control is also carried out on the basis of the speed detected value Vdp detected by the rotary encoder 18. As mentioned above, by using the detection system suitable for the injection process and the operation process (metering process) other than the injection process, there is an advantage that more accurate control can be carried out for each operation process. And when the metering process is finished, the above-mentioned injection is carried out at the same time (Steps S19, S11 ... ).

On the other hand, FIGS. 8A to 8C and FIG. 9 show data by which effects of the controller 1 according to the present invention (this embodiment) and the controller according to the prior art (Japan Patent Laid-Open No. 2007-69500) can be compared.

Figure 8:
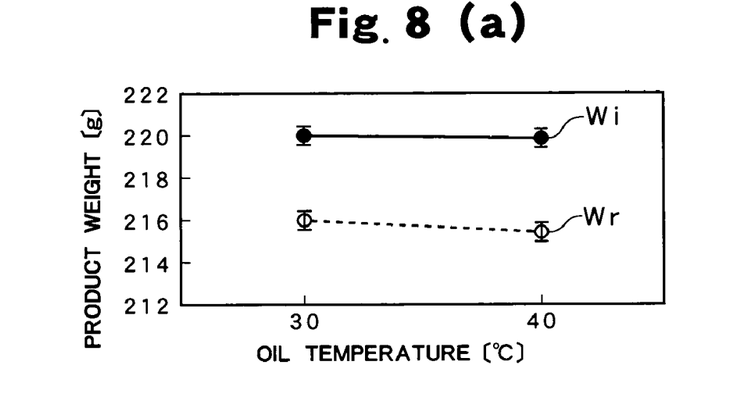
FIG. 8A is a comparison data diagram of a product weight to an oil temperature for explaining an effect of the controller.
FIG. 8B is a comparison data diagram of filling time to an oil temperature for explaining an effect of the controller.
FIG. 8C is a comparison data diagram of pressure holding power to an oil temperature for explaining an effect of the controller.
Figure 9:
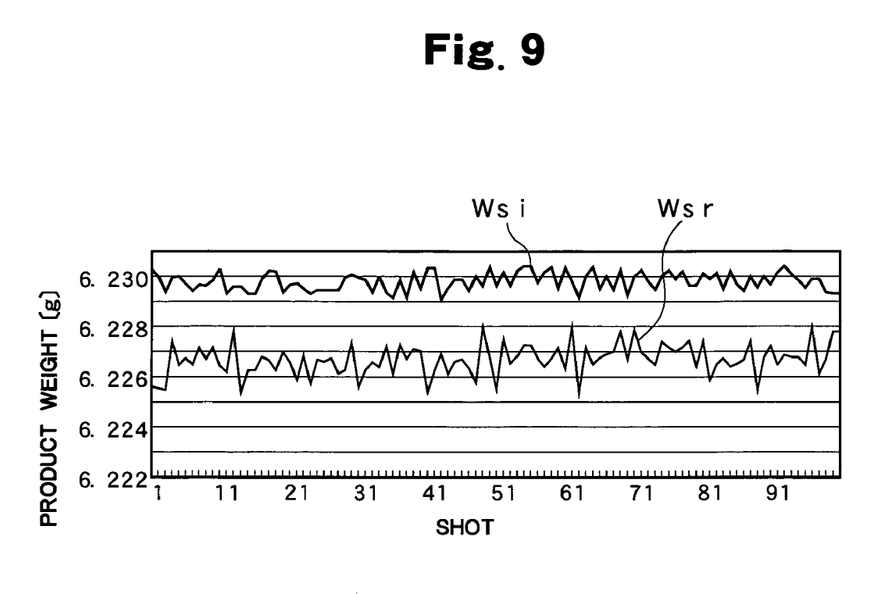
FIG. 9 is a comparison data diagram for explaining another effect of the controller.

FIG. 8A shows a product weight (molded product weight) [g] when the oil temperature is changed from 30[° C.] to 40[° C.], in which Wi indicates the product weight by this invention and Wr indicates the product weight by the prior art. In the product weight Wi by this invention, weight reduction is avoided and fluctuation in oil temperature rarely affects the weight as compared with the product weight Wr by the prior art. FIG. 8B shows a filling time [s] when the oil temperature is changed from 30[° C.] to 40[° C.], in which Ti is a filling time by this invention and Tr is the filling time by the prior art. The filling time Ti by this invention is shorter than the filling time Tr by the prior art and is rarely affected by the fluctuation in the oil temperature. Moreover, FIG. 8C shows a pressure holding power [MPa] when the oil temperature is changed from 40[° C.] to 45[° C.], in which Phi indicates the pressure holding power by this invention and Phr indicates the pressure holding power by the prior art. The pressure holding power Phi by this invention is higher than the pressure holding power Phr by the prior art and is rarely affected by the fluctuation in the oil temperature. Meanwhile, FIG. 9 shows distribution of the product weight [g] per shot, in which Wsi indicates the product weight by this invention and Wsr indicates the product weight by the prior art. In the product weight Wsi by this invention, weight reduction is avoided and fluctuation in oil temperature rarely affects the weight as compared with the product weight Wsr by the prior art.

Figure 10:
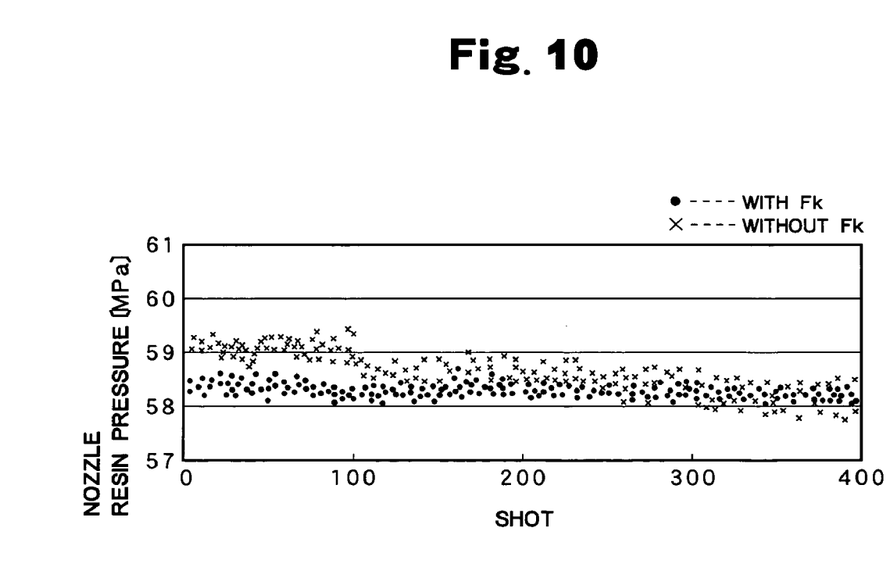
FIG. 10 is a comparison data diagram for explaining an effect of the integral term control function portion in the controller.

FIG. 10 shows a nozzle resin pressure [MPa] detected by the nozzle resin pressure sensor 6*a* per shot when the integral term control function portion Fk is used and when it is not used in the controller 1 according to this embodiment. In this figure, a painted circle indicates a case where both the VP switching control function portion Fc and the integral term control function portion Fk are used, while a cross mark indicates a case where only the VP switching control function portion Fc is used and the integral term control function portion Fk is not used. As is obvious from the figure, by using both the VP switching control function portion Fc and the integral term control function portion Fk, fluctuation in the nozzle resin pressure [MPa] is decreased and stable resin pressure can be obtained.

The preferred embodiment has been described in detail as above, but the invention is not limited to the embodiment but arbitrary changes in a range not departing from the spirit of the invention can be made to circuit configuration, method, numeral values and the like in details or added and deleted as necessary.

For example, such a case was shown in the above regarding the VP switching control function portion Fc that the speed setter 12 setting the control pattern Dp for outputting the correction command value Va corresponding to the pressure deviation Ep and the adder 13 for adding the correction command value Va outputted from the speed setter 12 to the speed command value Vc created on the basis of the pressure deviation Ep are provided in configuration, but that may be replaced by another circuit configuration as long as it exerts a function to change the speed command value in the speed command region Zv to the pressure control region Zp after control by the predetermined control pattern Dp. Similarly, such a case was shown regarding the integral term control function portion Fk that the integral term of the PID control system 15*c* in the pressure compensation portion 15 for pressure-compensating the pressure deviation Ep is pre-set to a new integral term that has the speed command value Vc after switching matched with the speed command value Vc before switching, but that may be replaced by another configuration as long as the similar function is exerted. Also, as the hydraulic pump 2 for which a plurality of fixed discharge flow rates Qo ... can be set, the variable discharge type hydraulic pump 2*m* for which the fixed discharge flow rate Qo ... can be set by changing the swash-plate angle was exemplified, but another hydraulic pump 2 having the similar function may be used. Moreover, as the driving motor 3 for controlling each operation process in the molding cycle by variably controlling the rotation speed, the servo motor 3*s* was exemplified, but another driving motor 3 having the similar function may be used.

What is claimed is:

1. A controller for injection molding machine for controlling each operation process in a molding cycle by variably controlling a rotation speed of a driving motor in a hydraulic pump, comprising:
- a screw position sensor for detecting a screw position of the injection device;
- at least one or more injection pressure sensors for detecting an injection pressure on the basis of an operation of an injection cylinder of said injection device;
- a speed feedback control system for feedback control of a speed on the basis of a speed detected value obtained by converting a position detected value obtained from the screw position sensor at least in an injection process;
- a pressure feedback control system for feedback control of a pressure on the basis of a pressure detected value obtained from said injection pressure sensor at least at the injection process; and
- a switching control function portion for carrying out switching from a speed control region to a pressure control region when a pressure deviation between a preset pressure set value and said pressure detected value becomes a preset switching determination value or less and carrying out the switching to said pressure control region after control of a speed command value in said speed control region by a predetermined control pattern.

2. The controller of injection molding machine according to claim 1, wherein said injection pressure sensor uses a nozzle resin pressure sensor for detecting a resin pressure inside an injection nozzle in said injection device.

3. The controller of injection molding machine according to claim 1, wherein said injection pressure sensor uses a cylinder internal pressure sensor for detecting an oil pressure inside said injection cylinder.

4. The controller of injection molding machine according to claim 1, wherein said injection pressure sensor uses a die resin pressure sensor for detecting a resin pressure inside a die.

5. The controller of injection molding machine according to claim 1, wherein said switching control function portion is provided with a speed setter that sets a control pattern for outputting a correction command value corresponding to said pressure deviation and an adder for adding a correction command value outputted from the speed setter to a speed command value created on the basis of said pressure deviation.

6. The controller of injection molding machine according to claim 5, wherein said correction command value is obtained by converting a preset speed set value by said control pattern.

7. The controller of injection molding machine according to claim 1, further comprising, at the switching from said speed control region to said pressure control region, an integral term control function portion for presetting an integral term of a PID control system in a pressure compensation portion for pressure-compensating said pressure deviation to a new integral term that has a speed command value after switching matched with the speed command value before the switching.

8. The controller of injection molding machine according to claim 7, wherein said new integral term is acquired by calculating back the speed command value before said switching by a predetermined calculation expression.

9. The controller of injection molding machine according to claim 8, wherein for said predetermined calculation expression, the following expression is used:

new integral term = $\{(Vcr/Gpr)+Dr-Ep\} \cdot Gi$ where Vcr: old speed command value;
Gpr: old proportional gain;
Dr: old differentiation output;
Ep: new pressure deviation; and
Gi: new integral gain.

10. The controller of injection molding machine according to claim 1, wherein said speed feedback control system includes a PID control system for executing I-PD control.

11. The controller of injection molding machine according to claim 1, wherein said pressure feedback control system includes a PID control system for executing PI-D control.

12. The controller of injection molding machine according to claim 1, further comprising:
- a pump pressure sensor for detecting an oil pressure discharged from said hydraulic pump; and
- a rotary encoder for detecting a rotation speed of said driving motor, wherein
- in an operation process other than said injection process, pressure feedback control is carried out on the basis of a pressure detected value detected by said pump pressure sensor and speed feedback control is carried out on the basis of a speed detected value obtained by converting a position detected value obtained from said rotary encoder.

13. The controller of injection molding machine according to claim 1, wherein said hydraulic pump uses a hydraulic pump for which at least a plurality of fixed discharge flow rates can be set.

14. The controller of injection molding machine according to claim 13, wherein said hydraulic pump uses a variable discharge hydraulic pump for which said fixed discharge flow rate can be set by changing a swash plate angle.

15. The controller of injection molding machine according to claim 1, wherein said driving motor is a servo motor.

* * * * *